(12) United States Patent
Ohara

(10) Patent No.: US 10,740,054 B2
(45) Date of Patent: Aug. 11, 2020

(54) IMAGE FORMING SYSTEM, MANAGEMENT SERVER, AND A NON-TRANSITORY COMPUTER READABLE RECORDING MEDIUM STORING A SERVER PROGRAM

(71) Applicant: KYOCERA Document Solutions Inc., Osaka (JP)

(72) Inventor: Ikuya Ohara, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 16/176,885

(22) Filed: Oct. 31, 2018

(65) Prior Publication Data
US 2019/0163426 A1  May 30, 2019

(30) Foreign Application Priority Data
Nov. 29, 2017 (JP) .................. 2017-229671

(51) Int. Cl.
*G06F 3/12* (2006.01)
*G06F 9/54* (2006.01)

(52) U.S. Cl.
CPC .......... *G06F 3/1273* (2013.01); *G06F 3/1211* (2013.01); *G06F 9/542* (2013.01)

(58) Field of Classification Search
None
See application file for complete search history.

(56) References Cited

U.S. PATENT DOCUMENTS

| | | | | |
|---|---|---|---|---|
| 2011/0182597 | A1* | 7/2011 | Motoyama | G03G 15/5004 399/37 |
| 2012/0222036 | A1* | 8/2012 | Yoshimura | H04N 1/0092 718/103 |
| 2016/0364184 | A1* | 12/2016 | Nakatani | G06F 3/1204 |
| 2017/0308341 | A1* | 10/2017 | Ormond | G06F 3/1267 |

FOREIGN PATENT DOCUMENTS

| | | | |
|---|---|---|---|
| AU | 2003201867 | * | 7/2003 |
| JP | 2014-135584 | | 7/2014 |

* cited by examiner

*Primary Examiner* — Fan Zhang

(57) ABSTRACT

An image forming system includes an image forming apparatus and a management server. The management server acquires a job log of the image forming apparatus. Further, the management server determines a high load period of the image forming apparatus on the basis of the job log. In the determined high load period, the image forming apparatus (a) temporarily stops a specific resident process or (b) temporarily prohibits a specific interface call in the specific resident process.

5 Claims, 2 Drawing Sheets

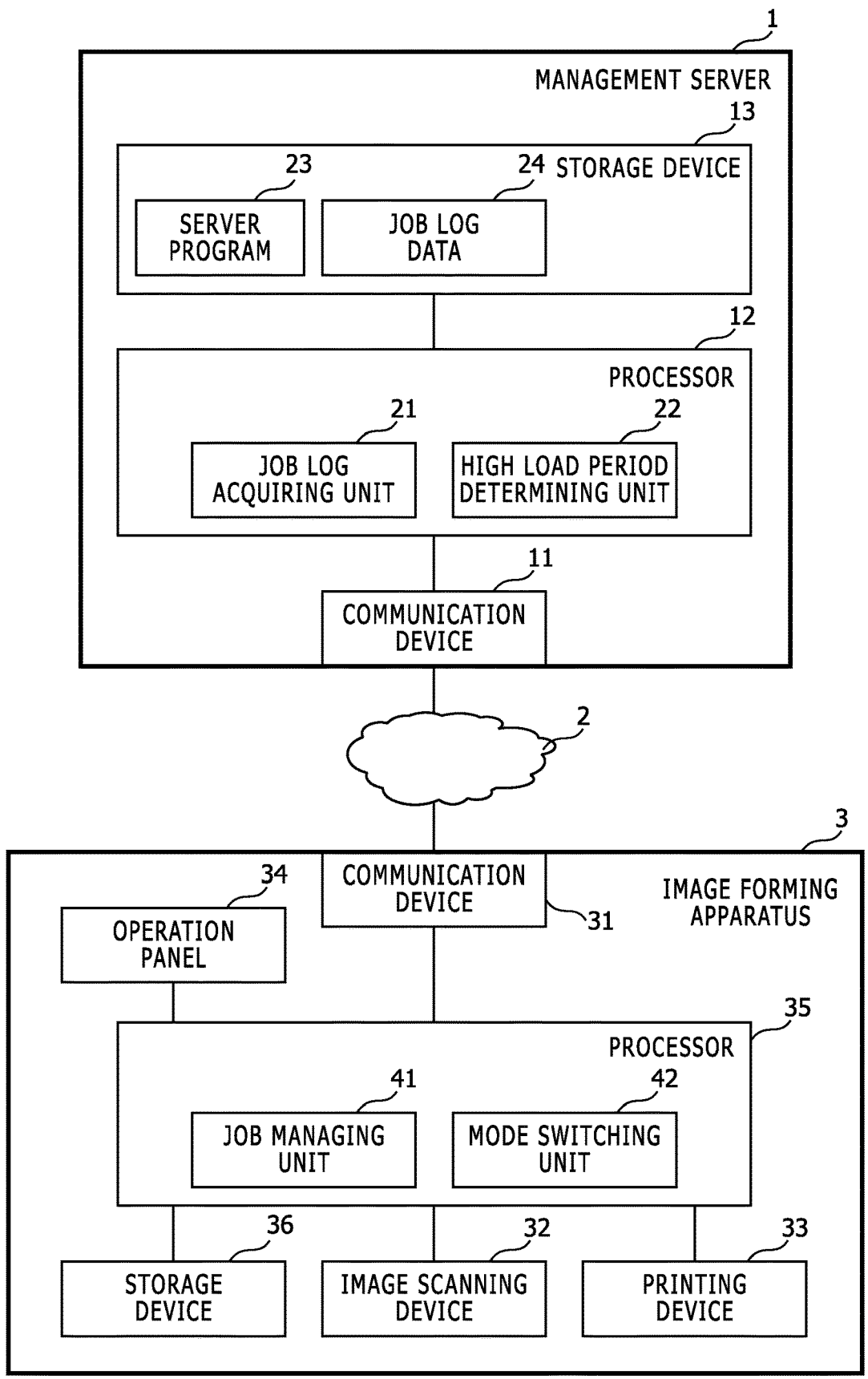

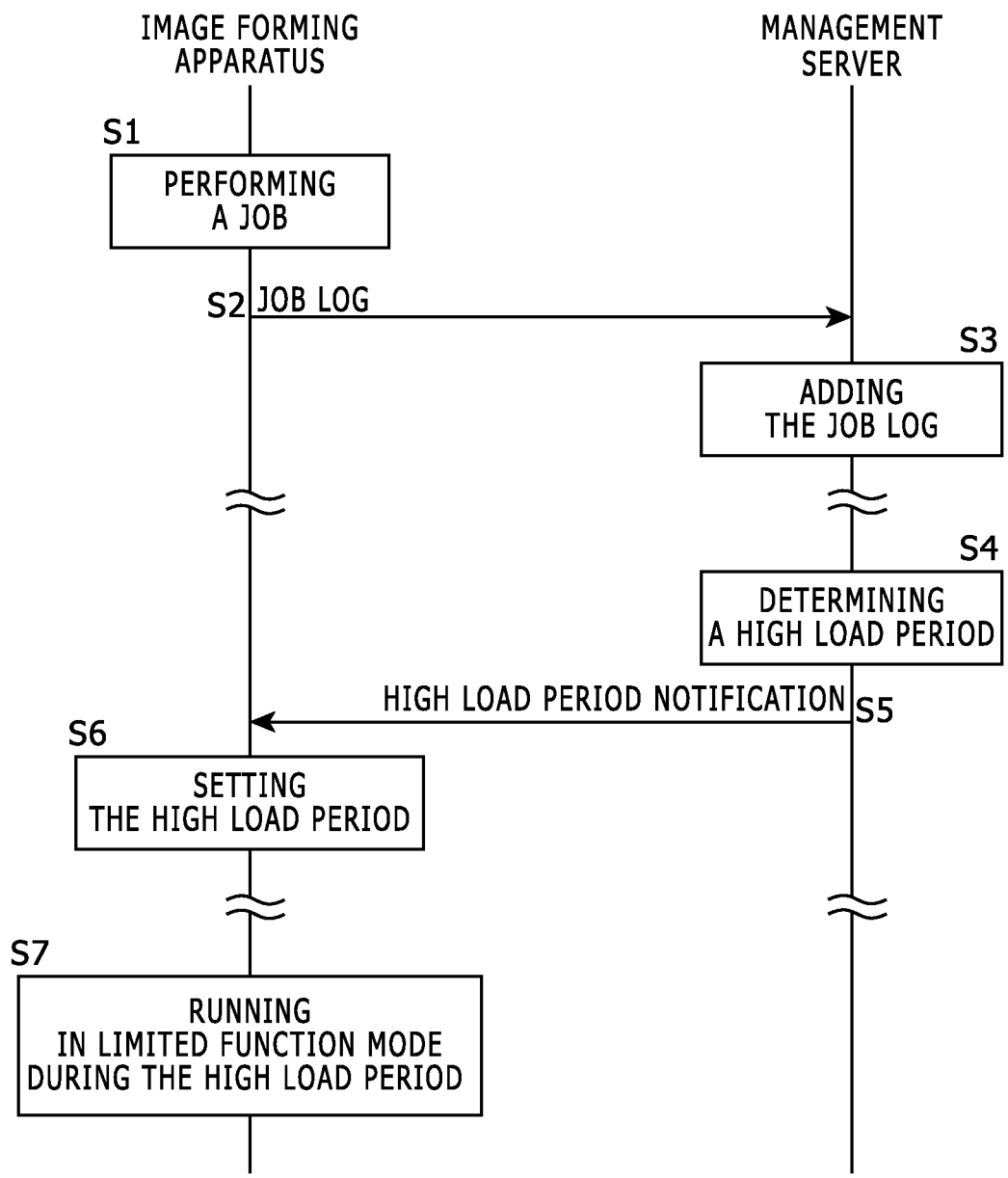

IMAGE FORMING SYSTEM, MANAGEMENT SERVER, AND A NON-TRANSITORY COMPUTER READABLE RECORDING MEDIUM STORING A SERVER PROGRAM

CROSS-REFERENCE TO RELATED APPLICATIONS

This application relates to and claims priority rights from Japanese Patent Application No. 2017-229671, filed on Nov. 29, 2017, the entire disclosures of which are hereby incorporated by reference herein.

BACKGROUND

1. Field of the Present Disclosure

The present disclosure relates to an image forming system, a management server, and a non-transitory computer readable recording medium storing a server program.

2. Description of the Related Art

In an image forming apparatus, a print overrun as a trouble sometimes occurs. A print overrun is a phenomenon that a toner image is not prepared until a printing paper sheet is transported to a transfer position of the toner image to be transferred to the printing paper sheet and consequently the printing paper sheet passes through the transfer position without transferring the toner image.

Image data is generated in a predetermined image process in accordance with a print request, a toner image is formed on the basis of the generated image data using a predetermined development process. Therefore, if the generation of the image data is delayed in a processor when a built-in CPU of the image forming apparatus runs at almost 100% of its CPU usage rate, then the aforementioned print overrun may occur.

An image forming apparatus limits its operating condition when a CPU usage rate of a built-in CPU exceeds a threshold value, and thereafter allows to perform a job when the CPU usage rate gets equal to or lower than the threshold value.

The aforementioned print overrun often occurs at continuous printing, and therefore if it occurs in massive printing in a specific period such as an end of a month, it causes a delay of user's business.

However, in the aforementioned image forming apparatus, starting of a job is delayed until the CPU usage rate gets equal to or less than a threshold value, and in addition, even when a job is started under a condition that the CPU usage rate is equal to or less than a threshold value, if the CPU usage rate increases due to another process before the end of the job, then a trouble such as the aforementioned print overrun may occur.

SUMMARY

An image forming system according to an aspect of the present disclosure includes an image forming apparatus, and a management server configured to acquire a job log of the image forming apparatus. The management server determines a high load period of the image forming apparatus on the basis of the job log. In the determined high load period, the image forming apparatus (a) temporarily stops a specific resident process or (b) temporarily prohibits a specific interface call in the specific resident process.

A management server according to an aspect of the present disclosure includes a communication device capable of communicating with an image forming apparatus, a job log acquiring unit and a high load period determining unit. The job log acquiring unit is configured to acquire a job log of the image forming apparatus using the communication device. The high load period determining unit is configured to determine a high load period of the image forming apparatus on the basis of the job log.

A non-transitory computer readable recording medium according to an aspect of the present disclosure stores a server program that causes a computer to act as the job log acquiring unit and the high load period determining unit.

These and other objects, features and advantages of the present disclosure will become more apparent upon reading of the following detailed description along with the accompanied drawings.

BRIEF DESCRIPTION OF THE DRAWINGS

FIG. 1 shows a block diagram that indicates a configuration of an image forming system in an embodiment of the present disclosure; and FIG. 2 shows a sequence diagram that explains a behavior of the image forming system shown in FIG. 1.

DETAILED DESCRIPTION

Hereinafter, an embodiment according to an aspect of the present disclosure will be explained with reference to drawings.

FIG. 1 shows a block diagram that indicates a configuration of an image forming system in an embodiment of the present disclosure. In the system shown in FIG. 1, a management server 1 is connected to a network 2, and one or more image forming apparatuses 3 is connected to the network 2. The management server 1 is capable of communicating with the image forming apparatus 3 through the network 2, and acquires a job log of the image forming apparatus 3. The network 2 includes a LAN (Local Area Network) such as intranet, a WAN (Wide Area Network) such as Internet, and/or the like. The image forming apparatus 3 is a printer, a multi function peripheral or the like.

The management server 1 shown in FIG. 1 includes a communication device 11 such as a network interface, a processor 12 and a non-volatile storage device 13 that stores sorts of programs and data.

The communication device 11 is connected to the network 2 and performs data communication with another apparatus (e.g. the image forming apparatus 3) connected to the network 2.

The processor 12 is a computer that includes a CPU (Central Processing Unit), a ROM (Read Only Memory), a RAM (Random Access Memory) and the like, loads a program from the ROM, the storage device 13 or the like to the RAM, and executes the program with the CPU and thereby acts as various processing units.

Here, in the storage device 13, a server program 23 is stored, and the processor 12 executes the server program 23 and thereby acts as a job log acquiring unit 21 and a high load period determining unit 22.

The job log acquiring unit 21 acquires a job log of the image forming apparatus 3 using the communication device 11. The acquired job log is stored as job log data 24 into the storage device 13 so as to be associated with the image forming apparatus 3.

The high load period determining unit 22 determines a high load period of the image forming apparatus 3 on the basis of the job log of the image forming apparatus 3 in the job log data 24. Further, the high load period determining unit 22 notifies the image forming apparatus 3 of the determined high load period. For example, the high load period is specified as one or more days.

In this embodiment, the job log includes at least (a) a job type and (b) job performing date and time; and on the basis of a CPU usage rate corresponding to the job type indicated by the job log, the high load period determining unit 22 determines as the high load period of the image forming apparatus 3 a period (e.g. a day or a week) in which regarding a job that caused a CPU usage rate higher than a predetermined threshold value, a job occurrence rate of the job exceeds a predetermined threshold value.

The job type is "copy", "send", "facsimile", "printer", "application" or the like; and for "copy", "send" and "facsimile", the CPU usage rate is relatively low, and for "printer" and "application", the CPU usage rate is relatively high. In a "printer" job, a spooler server in a host device (e.g. a personal computer or the like) accesses the image forming apparatus 3 lots of times, and consequently the CPU usage rate gets relatively high. In particular, if a "printer" job requests (a) printing from a driver that causes the image forming apparatus 3 to perform much data processing or (b) driver-less printing, the CPU usage rate gets high. An "application" job is, for example, a job that displays a remote panel (operation panel) on an external device such as smart phone.

Further, the high load period determining unit 22 may (a) notify the image forming apparatus 3 of the determined high load period, and thereby causes the image forming apparatus 3 to temporarily stop a specific resident process or temporarily prohibit a specific interface call in the specific resident process and (b) with this notification, may specify the specific resident process or the specific interface call to image forming apparatus 3.

The resident process is started when the image forming apparatus 3 starts, and resides (i.e. stands-by in background) until shutdown of the image forming apparatus 3 and automatically take an action when required. For example, the resident process is a process for network communication (e.g. DHCP (Dynamic Host Configuration Protocol) client process or the like), a process for facsimile reception, or the like. For example, these resident processes are specified as the aforementioned specific resident processes.

In such a case, the high load period determining unit determines a resident process or an interface call required to a job performed in a period determined as the high load period on the basis of a job log in the job log data 24, and specifies the aforementioned specific resident process or the aforementioned specific interface call so as to exclude the determined resident process or interface call required for the job.

Further, the image forming apparatus 3 shown in FIG. 1 includes, as internal devices, a communication device 31 such as network interface, an image scanning device 32, a printing device 33, an operation panel 34, a processor 35, and a non-volatile storage device 36 storing sorts of programs and data.

The communication device 31 is connected to the network 2 and performs data communication with another apparatus (e.g. the management server 1) connected to the network 2.

The image scanning device 32 optically scans a document image of a document and generates image data of the document image. The printing device 33 prints an image based on the image data, for example, in an electrographic manner. The operation panel 34 includes a display device such as a liquid crystal display and/or an indicator, and an input device such as a touch panel and/or a hard key; and displays sorts of operation screens or dialogs to a user using the display device and detects a user operation to the operation screen or the dialog using the input device.

The processor 35 is a computer that includes a CPU, a ROM, and a RAM, and loads a program to the RAM from the ROM, the storage device 36 or the like and executes the program using the CPU and thereby acts as sorts of processing units. Here the processor 35 acts as a job managing unit 41 and a mode switching unit 42.

The job managing unit 41 receives a job request from a host device (not shown) or the operation panel 34, and upon receiving the job request, performs a job using an internal device such as the image scanning device 32, the printing device 33 and/or the like, and thereafter transmits a job log of the performed job to the management server 1 using the communication device 31.

In the high load period of this image forming apparatus 3 determined by the management server 1, the mode switching unit 42 temporarily stops a specific resident process or temporarily prohibits a specific interface call in the specific resident process.

In this process, a resident process that was required in a job performed in a past high load period may not be stopped. Similarly, an interface call that was required in a job performed in a past high load period may not be prohibited.

Specifically, after the management server 1 notified this image forming apparatus 3 of a high load period, when the high load period comes, the mode switching unit 42 (a) moves to a limited function mode that temporarily stops a specific resident process or temporarily prohibits a specific interface call in the resident process, and (b) notifies a user of a function disabled in the limited function mode.

For the notification, for example, the mode switching unit 42 may display on the operation panel 34 a message that indicates the function disabled in the limited function mode; and/or for the notification, for example, the mode switching unit 42 may output through a speaker (not shown) a voice message that indicates the function disabled in the limited function mode.

The resident process stopped in the limited function mode and the interface call prohibited in the limited function mode may be set independently to each image forming apparatus 3 or may be set independently to each customer of the image forming apparatus 3.

The following part explains a behavior of the aforementioned image forming system. FIG. 2 shows a sequence diagram that explains a behavior of the image forming system shown in FIG. 1.

In the image forming apparatus 3, the job managing unit 41 performs a job (in Step S1) and transmits a job log to the management server 1 using the communication device 31 every time that the job is performed (in Step S2). In the management server 1, the job log acquiring unit 21 receives the job log using the communication device 11, and adds the received job log to the job log data 24 so as to associate the job log with this image forming apparatus 3 (e.g. its machine ID) (in Step S3).

In this manner, job logs are accumulated independently for each image forming apparatus 3.

In the management server 1, for each image forming apparatus 3, the high load period determining unit 22 determines a high load period on the basis the job log data 24 at a predetermined time point (e.g. once per month) (in Step S4), and notifies the image forming apparatus 3 of the determined high load period using the communication device 11 (in Step S5). In the image forming apparatus 3, the mode switching unit 42 receives this notification using the communication device 11, and sets the high load period indicated by the notification (in Step S6).

Afterward, the mode switching unit 42 watches whether the set high load period comes or not, and when the high load period comes, switches an operation mode of the image forming apparatus 3 from a normal mode (an operation mode that does not performs stopping the resident process nor prohibiting the interface call) to the aforementioned limited function mode (in Step S7).

Consequently, during the high load period, the image forming apparatus 3 runs in the limited function mode. When the high load period ends, the mode switching unit 42 returns the operation mode from the limited function mode to the normal mode, and thereafter the image forming apparatus 3 runs in the normal mode.

It should be noted that the high load period is set as the last date of each month, the first day of each month or the like, for example, and therefore repeatedly comes with a regular interval (e.g. one month). Consequently, until the high load period of the image forming apparatus 3 is updated by the management server 1, the image forming apparatus 3 runs in the limited function mode every time that the high load period currently set comes.

As mentioned, in the aforementioned embodiment, the management server 1 acquires a job log of the image forming apparatus 3, and determines a high load period of the image forming apparatus 3 on the basis of the job log; and during the determined high load period, the image forming apparatus temporarily stops a specific resident process or temporarily prohibits a specific interface call of the specific resident process.

Consequently, a high load period of each image forming apparatus 3 is automatically determined by the management server 1, and a CPU usage rate of the image forming apparatus decreases in the high load period, and therefore it restrains a trouble (i.e. print overrun or the like) due to a high load status of a built-in processor of the image forming apparatus 3 in a specific period.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, one image forming apparatus 3 is depicted in FIG. 1. Alternatively, the system in the aforementioned embodiment may include plural image forming apparatuses 3.

Further, in the aforementioned embodiment, the image forming apparatus 3 may include in the job log a CPU usage rate detected when performing a job (e.g. a highest CPU usage rate or an average CPU usage rate in a job performing period), and the management server 1 may calculate and determine the high load period on the basis of the CPU usage rate of each job indicated by the job log.

What is claimed is:

1. An image forming system, comprising:
an image forming apparatus; and
a management server configured to acquire a job log of the image forming apparatus;
wherein the management server determines a high load period of the image forming apparatus on the basis of the job log and determines whether specific resident processes or specific interface calls were required for jobs performed in the high load period on the basis of the job log;
in the determined high load period, the image forming apparatus (a) temporarily stops a specific resident process or (b) temporarily prohibits a specific interface call in the specific resident process if the specific resident process or specific interface call to be stopped or prohibited was not determined to be required for jobs performed in the high load period.

2. The image forming system according to claim 1, wherein the management server notifies the image forming apparatus of the determined high load period; and
when the high load period comes, the image forming apparatus (a) moves to a limited function mode that temporarily stops a specific resident process or temporarily prohibits a specific interface call in the specific resident process, and (b) notifies a user of a function temporarily disabled in the limited function mode.

3. A management server, comprising:
a communication device capable of communicating with an image forming apparatus;
a job log acquiring unit configured to acquire a job log of the image forming apparatus using the communication device; and
a high load period determining unit configured to determine a high load period of the image forming apparatus on the basis of the job log; wherein the high load period determining unit notifies the image forming apparatus of the determined high load period, and thereby (a) causes the image forming apparatus to temporarily stop a specific resident process or temporarily prohibit a specific interface call in the specific resident process and (b) specifies the specific resident process or the specific interface call to image forming apparatus;
wherein the image forming apparatus will not temporarily stop the specific resident process or temporarily prohibit the specific interface call in the specific resident process that was required for a job performed in the high load period on the basis of the job log.

4. The management server according to claim 3, wherein the job log includes at least (a) a job type and (b) job performing date and time; and
on the basis of a CPU usage rate corresponding to the job type indicated by the job log, the high load period determining unit determines as the high load period a period in which regarding a job that caused a CPU usage rate higher than a predetermined threshold value, a job occurrence rate of the job exceeds a predetermined threshold value.

5. A non-transitory computer readable recording medium storing a server program, wherein the server program causes a computer to act as:
a job log acquiring unit configured to acquire a job log of an image forming apparatus using a communication device; and
a high load period determining unit configured to determine a high load period of the image forming apparatus on the basis of the job log;
wherein the high load period determining unit notifies the image forming apparatus of the determined high load period, and thereby (a) causes the image forming apparatus to temporarily stop a specific resident process or temporarily prohibit a specific interface call in the specific resident process and (b) specifies the specific resident process or the specific interface call to image forming apparatus;

wherein the high load period determining unit will not specify to stop the specific resident process or temporarily prohibit the specific interface call in the specific resident process that was required for a job performed in the high load period on the basis of the job log.

* * * * *